United States Patent [19]
Watanabe et al.

[11] Patent Number: 5,743,167
[45] Date of Patent: Apr. 28, 1998

[54] PNEUMATIC BOOSTER

[75] Inventors: Shuzo Watanabe, Yamanashi-ken; Mitsuhiro Endo, Kanagawa-ken; Hiromi Ando, Yamanashi-ken, all of Japan

[73] Assignee: Tokico Ltd., Kawasaki, Japan

[21] Appl. No.: 715,894

[22] Filed: Sep. 19, 1996

[30] Foreign Application Priority Data

Sep. 20, 1995 [JP] Japan ................................. 7-266331
Sep. 20, 1995 [JP] Japan ................................. 7-266333

[51] Int. Cl.$^6$ ........................... F01B 19/00; F15B 11/00
[52] U.S. Cl. ........................... 92/48; 91/376 R; 91/533
[58] Field of Search ........................ 92/48, 49; 91/369.1, 91/369.2, 376 R, 533

[56] References Cited

U.S. PATENT DOCUMENTS

| | | | |
|---|---|---|---|
| 4,729,289 | 3/1988 | Boehm | 92/48 X |
| 5,029,515 | 7/1991 | Endo | 91/533 X |
| 5,158,006 | 10/1992 | Gotoh et al. | 91/376 R X |
| 5,277,100 | 1/1994 | Shinohara | 92/48 X |
| 5,460,781 | 10/1995 | Hirashita | 92/48 X |

FOREIGN PATENT DOCUMENTS

| | | |
|---|---|---|
| 2-162148 | 6/1990 | Japan . |
| 4-75759 | 7/1992 | Japan . |
| 4-215557 | 8/1992 | Japan . |

*Primary Examiner*—Hoang Nguyen
*Attorney, Agent, or Firm*—Wenderoth, Lind & Ponack

[57] ABSTRACT

A tandem pneumatic booster having a shell body, the inside of which is divided into two, front and rear, chambers by a center shell. Each chamber includes a negative pressure chamber and a working pressure chamber. A valve body is slidably fitted in the shell body and the center shell with seal members therebetween. The valve body is provided with an air passage for communication between the front and rear working pressure chambers. A valve mechanism is actuated in association with an input shaft to introduce atmospheric air into the front and rear working pressure chambers through the air passage so as to apply thrust to front and rear power pistons. The diaphragm of the front power piston has a bead on an inner periphery thereof. The valve body has a groove on an outer periphery thereof. A portion of the air passage which leads to the front working pressure chamber has a main passage portion extending axially in the valve body, and a bypass extending radially outward from the main passage portion. A communicating port leading to the front working pressure chamber extends axially from the bypass. The bypass opens into the groove, and the radially outer end of the bypass is sealed with the bead.

2 Claims, 6 Drawing Sheets

PNEUMATIC BOOSTER

BACKGROUND OF THE INVENTION

The present invention relates to a pneumatic booster used in brake systems of vehicles. More particularly, the present invention relates to a tandem pneumatic booster having a pair of negative pressure chambers and a pair of working pressure chambers.

A known tandem pneumatic booster includes a shell body and a center shell that divides the inside of the shell body into two, front and rear, chambers. The front and rear chambers each has a negative pressure chamber and a working pressure chamber, which are defined by a power piston with a diaphragm. The power pistons in the two chambers are attached to a valve body so as to move together with it. The valve body contains a valve mechanism having a plunger. The valve mechanism allows the outside air to be selectively supplied into the working pressure chambers to produce a difference between the pressure in the working pressure chambers and the negative pressure in the negative pressure chambers, thereby applying force to the valve body. The valve body is axially movably provided in the shell. A seal member is provided between the center shell and the valve body to allow the valve body to move relative to the center shell while keeping airtight conditions.

A space between the power piston in the front chamber and the center shell forms the working pressure chamber in the front chamber. The space is communicated with a passage provided in the valve body. Therefore, there is an opening on a side of the valve body. The working pressure chamber in the front chamber must have a relatively large width in the axial direction even in its smallest state in order to prevent the opening from being closed by the seal member fitted to the center shell over the entire travel range of the valve body. This causes the pneumatic booster to be undesirably large in the axial dimension.

SUMMARY OF THE INVENTION

The present invention is applicable to a pneumatic booster including a shell body and a center shell that divides the inside of the shell body into two, front and rear, chambers. The front chamber is divided into a front negative pressure chamber and a front working pressure chamber by a front power piston with a diaphragm. The rear chamber is divided into a rear negative pressure chamber and a rear working pressure chamber by a rear power piston with a diaphragm. A valve body is supported by the front and rear power pistons. The valve body extends through the center shell and the shell body with seal members therebetween and projects rearward of the shell body. The front and rear negative pressure chambers are communicated with each other through a negative pressure passage provided in the valve body. The front and rear working pressure chambers are communicated with each other through an air passage provided in the valve body. A valve mechanism is provided in the valve body so as to operate in association with an input shaft, thereby selectively introducing atmospheric air and a negative pressure into the front and rear working pressure chambers. According to the present invention, a communicating port of the air passage which leads to the front working pressure chamber opens axially into the front working pressure chamber.

DETAILED DESCRIPTION

Prior to the description of embodiments of the present invention, a prior art close to the present invention will be explained with reference to FIGS. 6 to 8 for the purpose of facilitating the understanding of the present invention.

Figure 6:
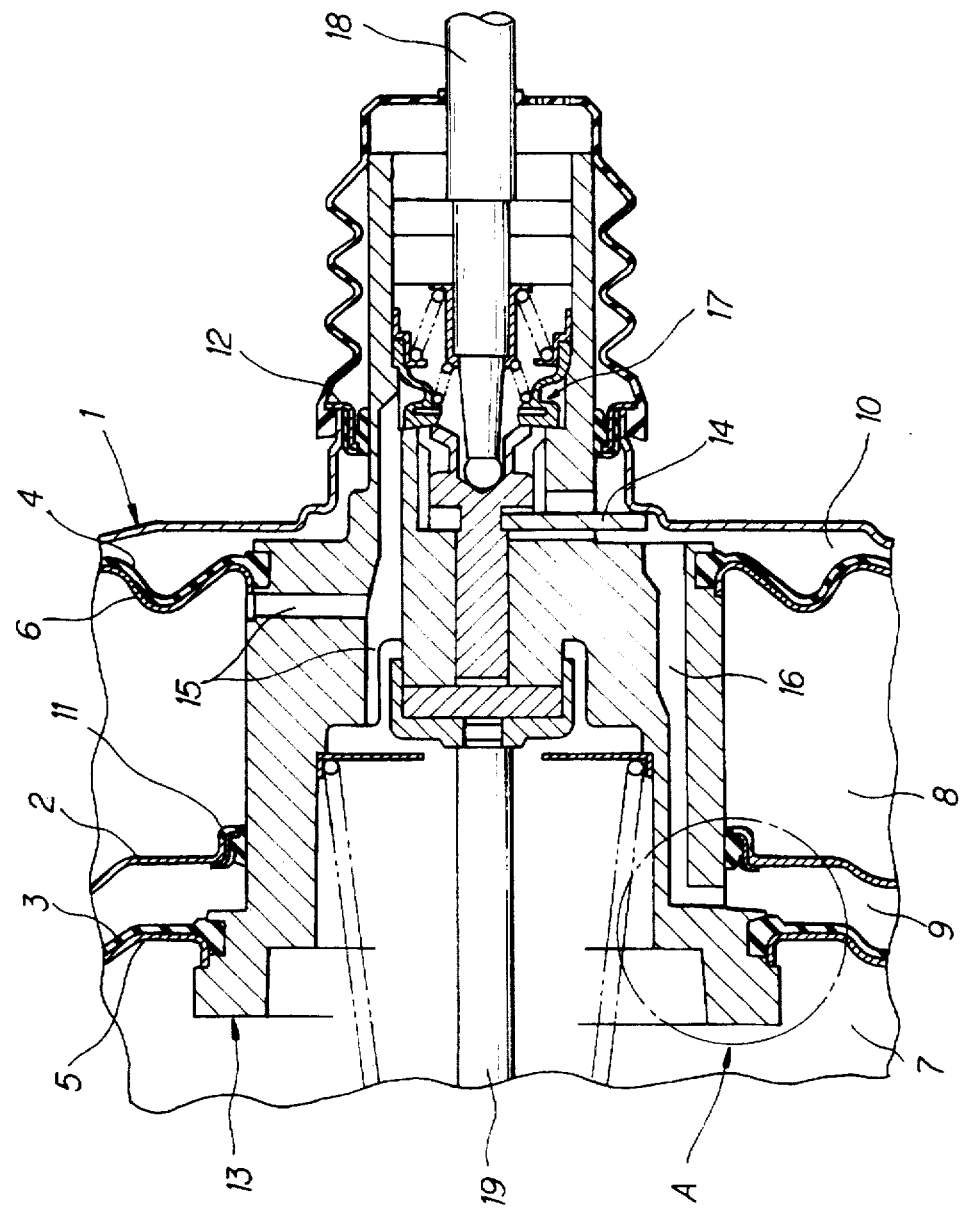
FIG. 6 is a sectional view showing the structure of an essential part of a conventional tandem pneumatic booster.

As shown in FIG. 6, a conventional tandem pneumatic booster has a shell body 1. The inside of the shell body 1 is divided into two, front and rear, chambers by a center shell 2. The front chamber is divided into a negative pressure chamber 7 and a working pressure chamber 9 by a power piston 5 with a diaphragm 3. Similarly, the rear chamber is divided into a negative pressure chamber 8 and a working pressure chamber 10 by a power piston 6 with a diaphragm 4. The power pistons 5 and 6 support a valve body 13. The valve body 13 extends through the center shell 2 and the shell body 1 with seal members 11 and 12 therebetween and projects rearward of the shell body 1. A stop key 14 restricts the backward return travel of the valve body 13 relative to the shell body 1. The front and rear negative pressure chambers 7 and 8 are communicated with each other through a negative pressure passage 15 provided in the valve body 13. The front and rear working pressure chambers 9 and 10 are communicated with each other through a pair of air passages 16 (only one of them is seen in the figure) provided in the valve body 13. A valve mechanism 17 is provided in the valve body 13 so as to operate in association with an input shaft 18. Thus, atmospheric air and a negative pressure are selectively introduced into the front and rear working pressure chambers 9 and 10. In this pneumatic booster, when atmospheric air is introduced into the front and rear working pressure chambers 9 and 10 by the operation of the valve mechanism 17, a large differential pressure is produced between the working pressure chambers 9 and 10 and the negative pressure chambers 7 and 8. Consequently, large thrust is applied to the power pistons 5 and 6, and thus boosted force is transmitted to an output shaft 19 operatively connected to the valve body 13.

Figure 7:
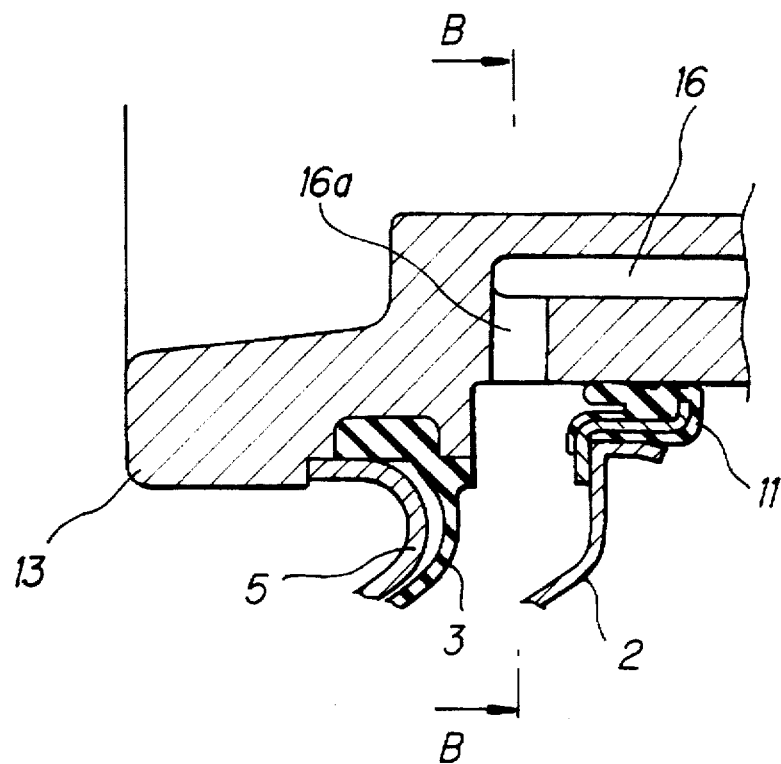
FIG. 7 is an enlarged sectional view of a part A in FIG. 6.
Figure 8:
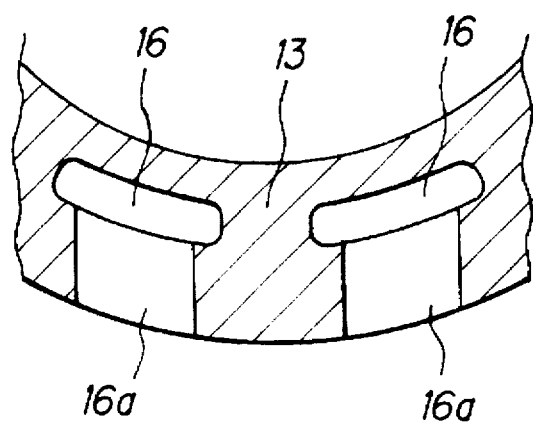
FIG. 8 is a sectional view of the part A as seen from the direction of the arrow B—B in FIG. 7.

According to the above-described conventional pneumatic booster, a pair of air passages 16 are provided in the valve body 13 to provide communication between the front and rear working pressure chambers 9 and 10, as will be clear from FIGS. 7 and 8. The air passages 16 have communicating ports 16a leading to the front working pressure chamber 9. The communicating ports 16a radially extend through the valve body 13 and open on a side thereof. Accordingly, if the setup position of the valve body 13 relative to the center shell 2 is shifted rearward, the seal member 11 fitted to the center shell 2 undesirably closes the communicating ports 16a, preventing atmospheric air from being sufficiently introduced into the front working pressure chamber 9 when a boosting action is needed. That is, the width of the working pressure chamber 9, which is defined by the center shell 2 and the diaphragm 3, needs to be of at least such magnitude as is shown in FIG. 7 in order to avoid adverse effect on the communicating ports 16a. More specifically, the effective range of utilization of the valve body 13 relative to the center shell 2 is limited to a range in which the seal member 11 fitted to the center shell 2 does not close the communicating ports 16a. Therefore, in order to obtain a desired boosting action, the length of the valve body 13 must be increased. This causes the overall length of the apparatus to increase, resulting unfavorably in an increase of the installation space for the apparatus relative to the vehicle body. Although it is conceivable to reduce the diameter of each communicating port 16a as an approach to solve the above-described problems, the reduction of the communicating port diameter makes it difficult to ensure the desired passage area, resulting in a delay in operation.

Embodiments of the present invention will be described below with reference to the accompanying drawings.

Figure 1:
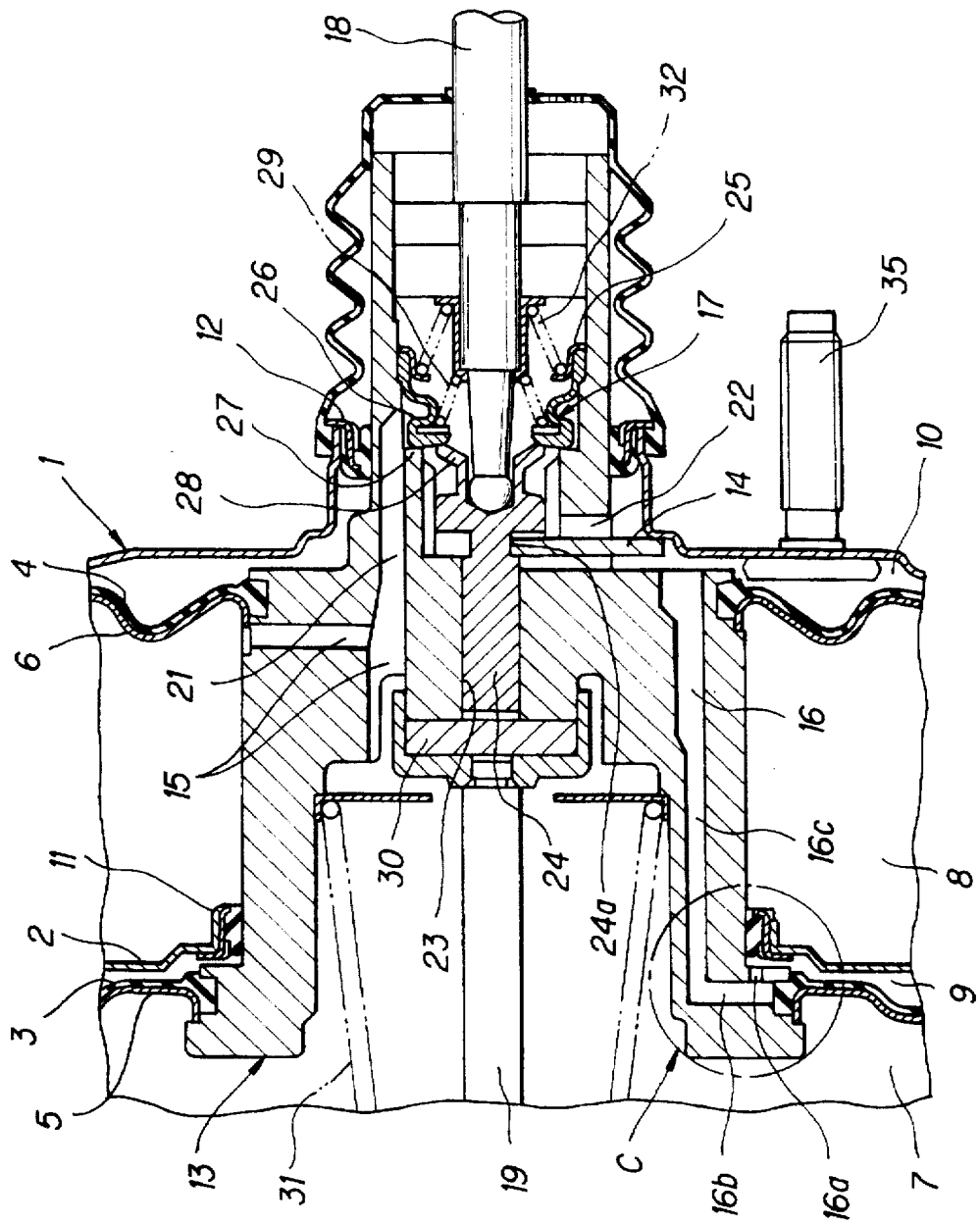
FIG. 1 is a sectional view showing the structure of an essential part of a tandem pneumatic booster according to a first embodiment of the present invention.
Figure 4:
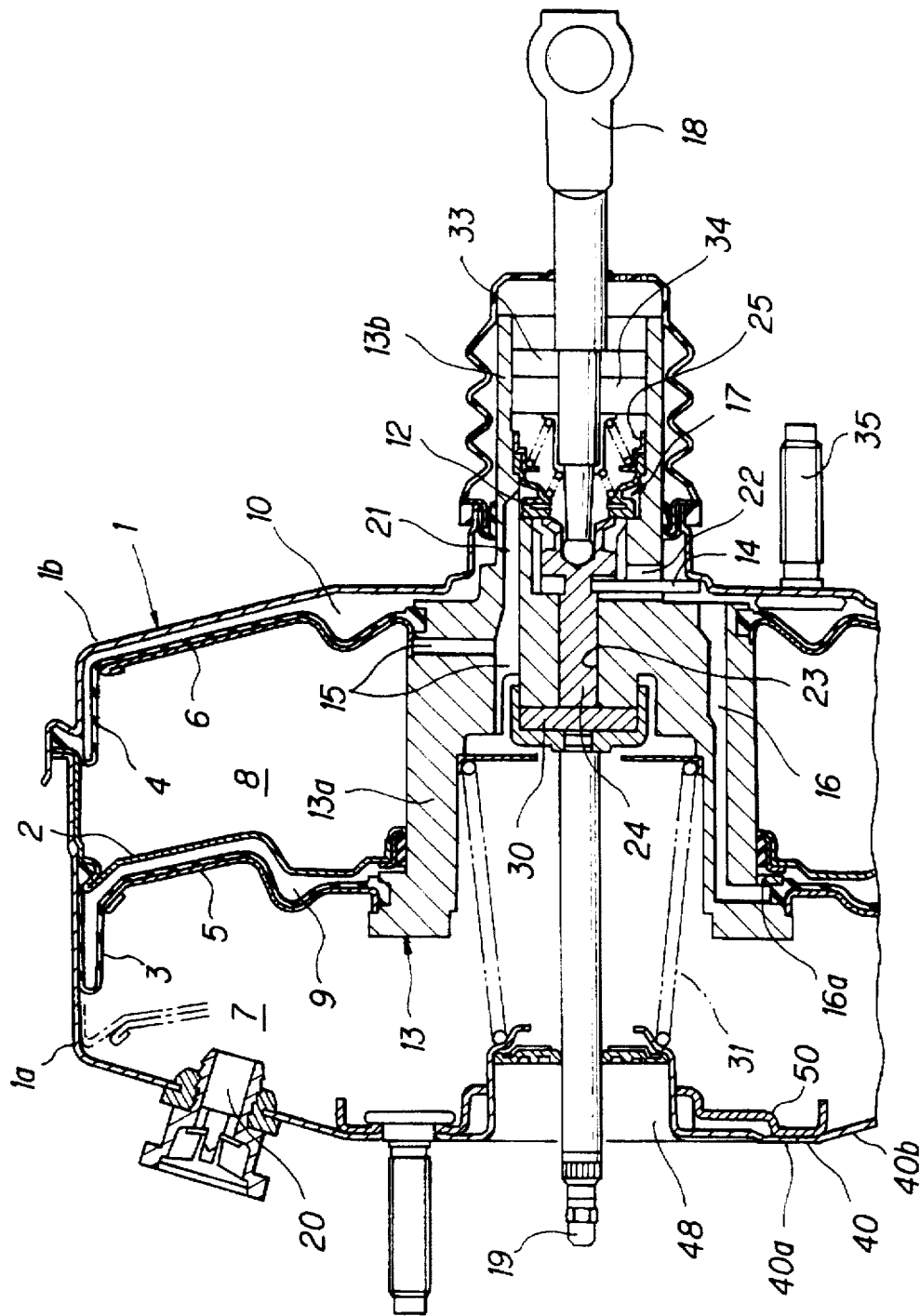
FIG. 4 is a sectional view showing the structure of the entire tandem pneumatic booster shown in FIG. 1.

FIG. 1 shows the structure of an essential part of a tandem pneumatic booster according to the present invention. FIG. 4 shows the structure of the entire tandem pneumatic booster. FIG. 1 shows the same part as in FIG. 6. Because the basic structure is not different from that of the conventional tandem pneumatic booster, in the drawings of the invention, the same members or portions as those of the prior art are denoted by the same reference characters. The shell body 1 comprises a front shell 1a and a rear shell 1b. The outer edge portions of the center shell 2 and the rear diaphragm 4 are integrally caulked between the front shell 1a and the rear shell 1b. The outer edge portion of the front diaphragm 3 is fixedly fitted between the center shell 2 and the front shell 1a. A front wall 40 of the front shell 1a is provided with an inlet opening 20 for introducing a negative pressure, e.g., engine suction pressure. The negative pressure introduced into the front negative pressure chamber 7 through the inlet opening 20 is also supplied to the rear negative pressure chamber 8 through the negative pressure passage 15.

The valve body 13 comprises a large-diameter portion 13a at a forward end thereof and a small-diameter portion 13b at a rear end thereof. The large-diameter portion 13a is accommodated in the shell body 1. The small-diameter portion 13b extends rearward of the rear shell 1b. It should be noted that the large-diameter portion 13a of the valve body 13 has a cup-shaped front end portion. The small-diameter portion 13b of the valve body 13 has a tubular configuration. The large-diameter portion 13a of the valve body 13 is provided with communicating passages 21 and 22 to allow the negative pressure passage 15 and the air passages 16 to communicate with the inside of the small-diameter portion 13b. Further, the large-diameter portion 13a has an axial bore 23 formed in its axial center to communicate the bottom of the cup-shaped front end portion to the inside of the small-diameter portion 13b. The axial bore 23 is slidably fitted with a plunger 24, which constitutes a part of the valve mechanism 17. The distal end of the input shaft 18, which operates in association with a brake pedal (not shown), is operatively connected to the rear end portion of the plunger 24.

The valve mechanism 17 has, in addition to the plunger 24, an elastically deformable valve member 26, a first valve seat 27, a second valve seat 28, and a valve spring 29. The valve member 26 is secured at its proximal end portion to the inner surface of the small-diameter portion 13b of the valve body 13 by using a retaining member 25. The first valve seat 27 is formed at the opening end of the communicating passage 21 leading to the negative pressure passage 15 such that the outer edge portion of the front end of the valve member 26 rests on the first valve seat 27 when the valve is closed. The second valve seat 28 is formed on the rear end of the plunger 24 such that the inner edge portion of the front end of the valve member 26 rests on the second valve seat 28 when the valve is closed. The valve spring 29 is engaged at one end thereof with the input shaft 18 to constantly bias the valve member 26 in a direction in which the valve member 26 is allowed to rest on the first and second seats 27 and 28.

A stop key 14 restricts the return travel of the valve body 13 relative to the shell body 1. The stop key 14 is externally inserted into the communicating passage 22 formed in the valve body 13, and the distal (inner) end portion of the stop key 14 is engaged with an annular groove 24a formed at a midpoint in the longitudinal direction of the plunger 24. The stop key 14 prevents the plunger 24 from moving more than is necessary relative to the valve body 13. The output shaft 19 is operatively connected to the bottom of the cup-shaped front end portion of the valve body 13 through a reaction disk 30 made of a rubber material. The output shaft 19 extends through the front shell 1a in an airtight manner and projects forward of the front shell 1a. A master cylinder (not shown) is operatively connected to the projecting end of the output shaft 19. A return spring 31 is disposed in the front negative pressure chamber 7 to return the power pistons 5 and 6 from their operative positions to their inoperative positions through the valve body 13. A spring 32 is disposed in the small-diameter portion 13b of the valve body 13 to constantly bias the input shaft 18 in a backward direction (toward the brake pedal). A silencer 33 and a filter 34 are disposed in the opening end of the small-diameter portion 13b of the valve body 13.

Figure 2:
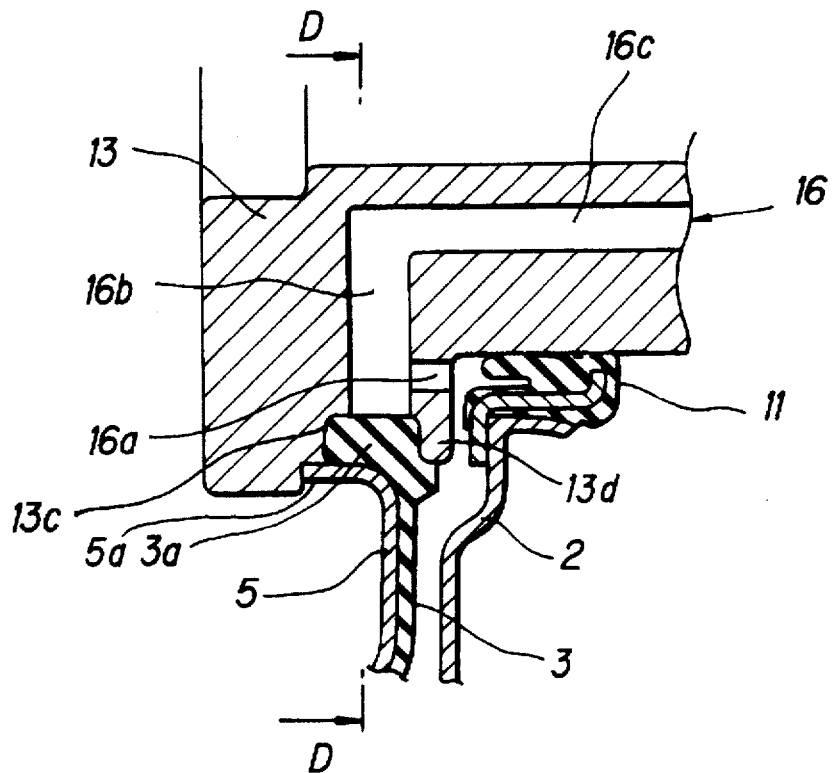
FIG. 2 is an enlarged sectional view of a part C in FIG. 1.
Figure 3:
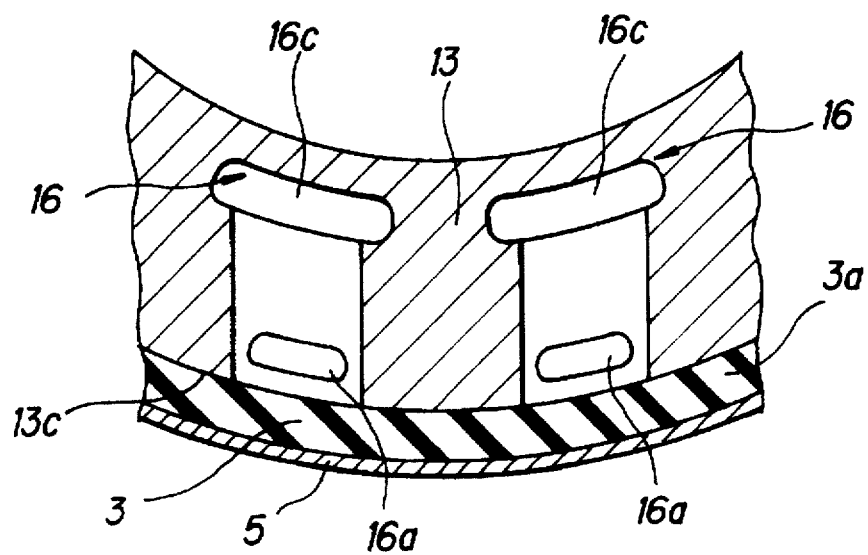
FIG. 3 is a sectional view of the part C as seen from the direction of the arrow D—D in FIG. 2.

As is clearly shown in FIGS. 2 and 3, a pair of air passages 16 for communication between the front and rear working pressure chambers 9 and 10 have communicating ports 16a leading to the working pressure chamber 9. The communicating ports 16a extend axially of the valve body 13 and open in the axial direction. The communicating ports 16a are communicated with main passage portions (axial bores) 16c of the air passages 16 through radial bypasses 16b formed in the front end portion of the valve body 13. The bypasses 16b extend radially inward from the outer peripheral surface of the valve body 13. The openings of the bypasses 16b are closed with a bead 3a provided at the inner edge of the front diaphragm 3.

The valve body 13 is provided with a circumferential groove 13c. The bead 3a of the diaphragm 3 is tightly fitted into the groove 13c, thereby enabling the diaphragm 3 to be reliably secured. The bypasses 16b, which are formed to provide communication between the communicating ports 16a and the main passage portions 16c, need to be cut from a side of the valve body 13. However, the bypasses 16b are cut in the groove 13c; therefore, the openings of the bypasses 16b, which open on the side of the valve body 13, are automatically sealed simply by fitting the bead 3a into the groove 13c.

The outer peripheral surface of the bead 3a is engaged by a portion 5a of the piston 5 which portion is bent at the inner end portion of the piston to axially extend so that the bead 3a is prevented from being coming off the groove 13c. The groove 13c has such a depth that a flange portion 13d formed by machining the groove surely prevents the bead 3a from moving rightward as viewed in FIG. 2 out of the groove. Since the communicating port 16a is formed in the flange portion 13d, it is easy to machine the communicating port.

When an engine is stopped, there is no vacuum in the negative pressure chamber 7 and, therefore, there is no pressure difference between the negative pressure chamber 7 and the working pressure chamber 9. When a brake pedal is pressed in this condition, the bead 3a is hardly urged against the flange portion 13d.

The pneumatic booster arranged as described above is mounted on the vehicle body by using a plurality of stud bolts 35 projecting from the rear surface of the rear shell 1b. In this mounted state, the brake pedal (not shown) is operatively connected to the input shaft 18. When the brake pedal is stepped on, the input shaft 18 moves forward, causing the plunger 24 to move leftward as viewed in FIG. 1 or 4. Consequently, the second valve seat 28 separates from the valve member 26. A negative pressure has previously been introduced into the working pressure chambers 9 and 10. Therefore, at the same time as the second valve seat 28 separates from the valve member 26, atmospheric air flows into the small-diameter portion 13b of the valve body 13 through the silencer 33 and the filter 34. The atmospheric air is introduced into the two working pressure chambers 9 and 10 through the communicating passage 22 and the air passages 16. As a result, a differential pressure is produced between the working pressure chambers 9 and 10 and the negative pressure chambers 7 and 8, in which a negative pressure has previously been introduced. Thus, thrust is applied to the front and rear power pistons 5 and 6, causing the valve body 13 to move forward relative to the center shell 2 and the rear shell 1b. In this way, boosted stepping force is transmitted to the output shaft 19, and reaction force occurring at this time is transmitted to the input shaft 18 from the reaction disk 30 through the plunger 24.

When the brake pedal is released from the stepping force, the input shaft 18 is moved rightward (backward) by the reaction force applied to the plunger 24 from the reaction disk 30 and restoring force from the spring 32. At this time, the plunger 24 also moves backward and pushes the valve member 26 to separate from the first valve seat 27. Consequently, a negative pressure is introduced into the valve body 13 through the communicating passage 21. The negative pressure is introduced into both the working pressure chambers 9 and 10 through the communicating passage 22 and the air passages 16 to cancel the above-described differential pressure. Thereafter, the valve body 13 is moved in the backward direction by pressing force from the return spring 31. The backward movement of the valve body 13 is stopped as the stop key 14 contacts the inner surface of the rear shell 1b. Thus, the power pistons 5 and 6 return to their previous positions.

Thus, the communicating ports 16a of the air passages 16 are not present on the outer peripheral surface (seal sliding contact portion) of the valve body 13. Therefore, the spacing between the center shell 2 and the power piston 5 can be reduced, and the overall length of the apparatus can be correspondingly reduced.

The above-described pneumatic booster is assembled as follows: A combination of the front power piston 5 and the front diaphragm 3, the center shell 2, and a combination of the rear power piston 6 and the rear diaphragm 4 are successively fitted onto the valve body 13 to form a subassembly in advance. Thereafter, the valve body 13 is fitted into the rear shell 1b of the shell body 1 from the forward end of the shell body 1 (i.e., from the left-hand side as viewed in FIG. 1 or 4). In the prior art, the communicating ports 16a of the air passages 16 are present on the outer peripheral surface of the valve body 13 (see FIGS. 6 and 7). Therefore, during the subassembling process, the seal member 11 fitted to the center shell 2 may be caught on and damaged by the edges of the communicating ports 16a while sliding on the outer peripheral surface of the valve body 13. According to this embodiment, it is possible to prevent damage to the seal member 11 even if the valve body 13 is inserted through the center shell 2 to a considerable extent during the subassembling process because the communicating ports 16a are not present on the surface of the valve body 13 on which the seal member 11 slides.

A cup portion 48 is formed in the center of the front wall 40 of the front shell 1a to receive a master cylinder (not shown). The return spring 31 is interposed between the bottom of the cup portion 48 and the front end of the valve body 13 to return the power pistons 5 and 6 to their previous positions (positions shown in the figures) after the boosting action.

In the above-described pneumatic booster, the front shell 1a and the rear shell 1b, which constitute the shell body 1, are formed in thin-walled structures in order to achieve a reduction of the weight. However, if the front and rear shells 1a and 1b are merely reduced in thickness, the rigidity is reduced, and it becomes likely that the shell body 1 will be deformed. Therefore, in the illustrated embodiment, the front wall 40 of the front shell 1a has a central disk portion 40a perpendicularly intersecting the output shaft 19, and a beveled portion 40b extending rearward from the disk portion 40a at a predetermined inclination angle toward the outer peripheral wall of the front shell 1a. With this structure, particularly with the beveled portion 40b, the desired rigidity is ensured. To further enhance the rigidity, a reinforcing plate 50 may be bonded to the back of the disk portion 40a of the front shell 1a.

Recently, it has been increasingly demanded to minimize the axial dimension of the shell body 1 to thereby achieve a reduction of the overall size of the apparatus in addition to the reduction of the overall weight. However, if the central disk portion 40a is merely shifted rearward (backward) in order to minimize the axial dimension, the inclination angle of the beveled portion 40b reduces, and the rigidity of the shell body 1 undesirably reduces. On the other hand, if the central disk portion 40a is shifted rearward with the inclination angle left as it is, the joint of the beveled portion 40b and the outer peripheral wall of the front shell 1a also shifts rearward. Consequently, when the power piston 5 moves forward by a substantial distance when, for example, an air evacuation from a brake is achieved or one of master cylinders is damaged to eliminate or reduce the resistance from the master cylinders to the power piston, the outer peripheral edge portion (shown by the chain lines in FIG. 4) of the power piston 5 interferes with the joint of the beveled portion 40b and the outer peripheral wall. Therefore, the overall size of the apparatus cannot be reduced as desired.

Figure 5:
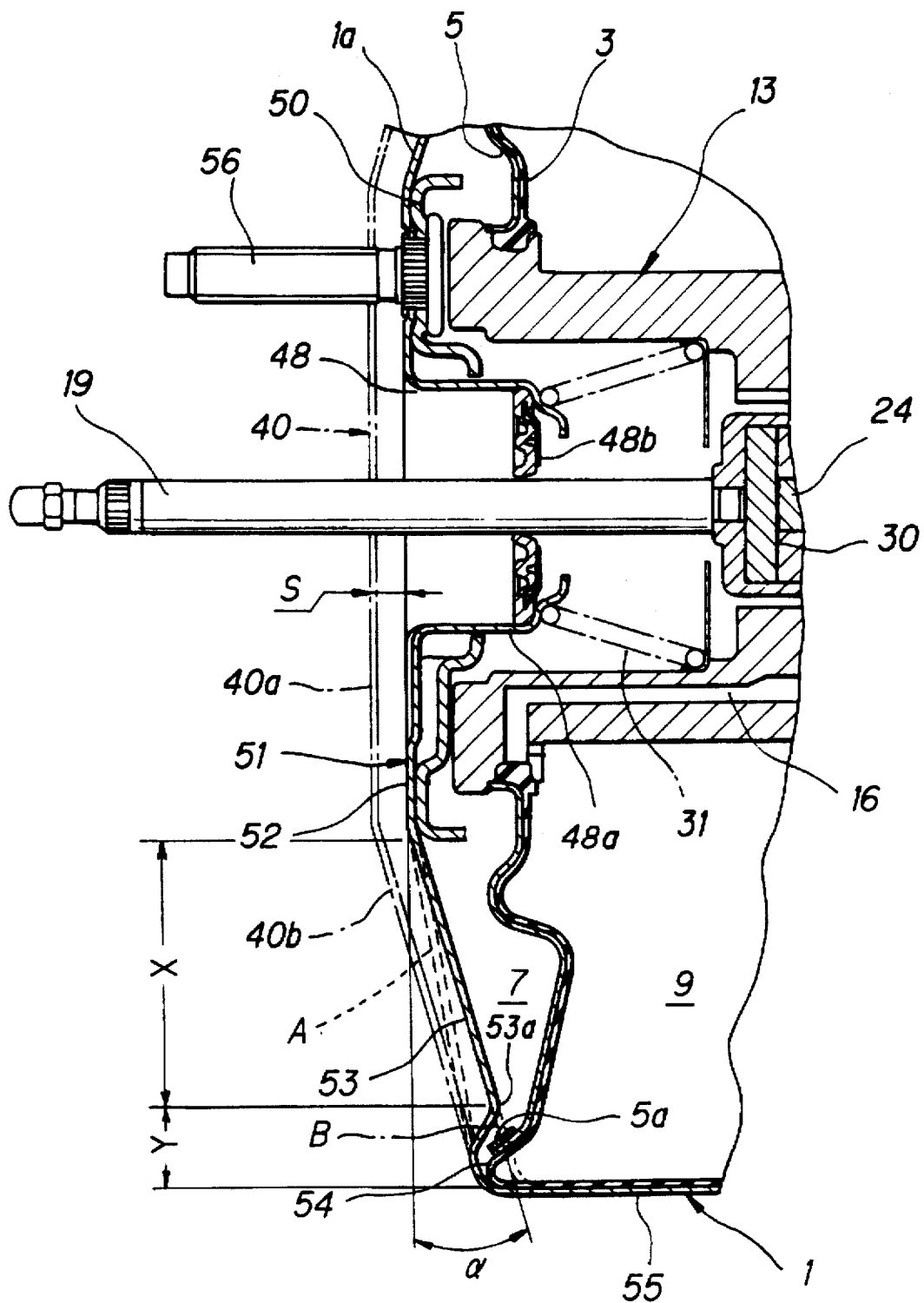
FIG. 5 is a sectional view of a tandem pneumatic booster according to a second embodiment of the present invention.

FIG. 5 shows a second embodiment of the present invention. In the second embodiment, the width of the working pressure chamber 9 in the first embodiment is reduced to shorten the overall length of the apparatus. In addition, the front shell 1a is made possible to shift inward of the apparatus, thereby further reducing the overall length of the apparatus. It should be noted that the same members or portions as those in the first embodiment are denoted by the same reference characters, and description thereof is omitted.

In the embodiment shown in FIG. 5, a front wall 51 of the front shell 1a has a central disk portion 52 perpendicularly intersecting the output shaft 19, and a beveled portion 53 extending rearward from the disk portion 52 at a predetermined inclination angle toward an outer peripheral wall 55 of the front shell 1a. The front wall 51 further has a ring-shaped raised portion 54 raised forward from the beveled portion 53 and connected to the outer peripheral wall 55. The disk portion 52 is provided with a cup portion 48 for receiving the master cylinder as is the case with the first embodiment. The cup portion 48 comprises a cylindrical member 48a integrally die-shaped with the front shell 1a, and a seal plate 48b fitted to the bottom of the cylindrical member 48a. The output shaft 19 extends through the seal plate 48b in an airtight manner. A reinforcing plate 50 is bonded to the back of the disk portion 52 as is the case with the first embodiment. The reinforcing plate 50 is integrated with the front shell 1a by a master cylinder mounting stud bolt 56 secured by caulking to the front wall 51 of the front shell 1a.

Thus, as shown clearly in FIG. 5, the disk portion 52 of the front wall 51 of the front shell 1a is shifted rearward by a predetermined distance S relative to the disk portion 40a of the front wall 40 in the first embodiment. The beveled portion 53 of the front wall 51 is extended from the disk portion 52 toward the outer peripheral wall 55 of the front shell 1a at the same inclination angle α as that of the beveled portion 40b of the front wall 40 in the first embodiment. The raised portion 54 of the front wall 51 of the front shell 1a is raised to an extent set such that, when the power piston 5 moves forward by a large distance, the outer peripheral edge portion 5a of the power piston 5 will not interfere with the raised portion 54.

The pneumatic booster according to this embodiment operates in the same way as in the first embodiment. When a brake pedal (not shown) is stepped on, the input shaft 18 moves forward, causing the valve mechanism 17 to be actuated to introduce atmospheric air into the two working pressure chambers 9 and 10. Consequently, a differential pressure is produced between the working pressure chambers 9 and 10 and the negative pressure chambers 7 and 8, in which a negative pressure has previously been introduced. The differential pressure causes the front and rear power pistons 5 and 6 to move forward to a considerable extent, as shown in FIG. 5. When the power piston moves forward by a large distance for some reason, the outer peripheral edge portion 5a of the power piston 5 enters the inside of the raised portion 54 of the front wall 51 of the front shell 1a. Thus, the stroke of the power piston 5 is satisfactorily ensured. Accordingly, there is no likelihood of the power piston being damaged.

In this embodiment, the disk portion 52 of the front wall 51 of the front shell 1a is shifted rearward by a predetermined distance S relative to the disk portion 40a of the front wall 40 in the first embodiment. Therefore, the axial length of the pneumatic booster according to this embodiment is shorter than that of the pneumatic booster according to the first embodiment by the distance S. Moreover, because the inclination angle α of the beveled portion 53 of the front wall 51 is the same as that of the beveled portion 40b of the front wall 40 in the first embodiment, there is no reduction in the rigidity of the front shell 1a. Incidentally, if the disk portion 52 alone is shifted rearward by the distance S and the inclination angle of the beveled portion 53 is reduced as shown by the dashed line A, the rigidity of the front shell 1a reduces. On the other hand, if the beveled portion 53 is connected directly to the outer peripheral wall 55 without providing the raised portion 54, the joint of the beveled portion 53 and the outer peripheral wall 55 shifts rearward as shown by the dashed line B. Consequently, the outer peripheral edge portion 5a of the power piston 5 would interfere with the joint when the power piston 5 moves forward by a large distance.

In order to prevent the rigidity of the front shell 1a from being reduced as effective as possible, the transit point 53a between the beveled portion 53 and the raised portion 54 should be positioned as radially outward as possible. In the light of the purpose of the present invention, the relationship defined by X>Y should at least be satisfied.

What is claimed is:

1. A pneumatic booster including a shell body;
    a center shell dividing the interior of said shell body into front and rear chambers;
    said front chamber being divided into a front negative pressure chamber and a front working pressure chamber by a front power piston with a diaphragm;
    said rear chamber being divided into a rear negative pressure chamber and a rear working pressure chamber by a rear power piston with a diaphragm;
    a valve body supported by said front and rear power pistons, said valve body extending through said center shell and said shell body with seal members therebetween and projecting rearward of said shell body;
    said front and rear negative pressure chambers being communicated with each other through a negative pressure passage provided in said valve body;
    said front and rear working pressure chambers being communicated with each other through an air passage provided in said valve body;
    a valve mechanism provided in said valve body so as to operate in association with an input shaft, thereby selectively introducing atmospheric air and a negative pressure into said front and rear working pressure chambers;
    said pneumatic booster further comprising:
    a communicating port of said air passage which leads to said front working pressure chamber, said communicating port opening axially into said front working pressure chamber,
    wherein said diaphragm of said front power piston has a bead on an inner periphery thereof, said valve body having a groove on an outer periphery thereof, and wherein a portion of said air passage which leads to said front working pressure chamber has a main passage portion extending axially in said valve body, and a bypass extending radially outward from said main passage portion, said communicating port extending axially from said bypass, said bypass opening into said groove, and said bypass being sealed at a radially outer end thereof by said bead.

2. A pneumatic booster according to claim 1, wherein said shell body comprises a front shell and a rear shell, said pneumatic booster further including an output shaft, said output shaft extending through said front shell and axially driven by said valve body, said front shell including a central disk portion perpendicularly intersecting said output shaft, a beveled portion extending rearward from said disk portion at a predetermined inclination angle toward an outer peripheral wall of said front shell, and an annular raised portion raised forward from said beveled portion and connected to said outer peripheral wall.

* * * * *